No. 887,635. PATENTED MAY 12, 1908.
D. HENDERSHOT.
BALING PRESS.
APPLICATION FILED MAY 24, 1907.

WITNESSES.

INVENTOR
D. HENDERSHOT.

BY

Attorneys

UNITED STATES PATENT OFFICE.

DAVID HENDERSHOT, OF CUMBERLAND, MARYLAND.

BALING-PRESS.

No. 887,635.

Specification of Letters Patent.

Patented May 12, 1908.

Application filed May 24, 1907. Serial No. 375,383.

*To all whom it may concern:*

Be it known that I, DAVID HENDERSHOT, a citizen of the United States of America, residing at Cumberland, in the county of Allegany and State of Maryland, have invented certain new and useful Improvements in Baling-Presses, of which the following is a specification, reference being had therein to the accompanying drawing.

This invention relates to baling-presses, especially adapted for baling hay by hand-power, and its primary object is to provide a press of simple and inexpensive construction adapted to be easily operated by a windlass.

A further object of the invention is to provide a baling-press with a reciprocating plunger, in combination with operating means therefor, and a device for permitting the reciprocation of the plunger with little friction. The construction of the improved press will be fully described hereinafter in connection with the accompanying drawing which forms a part of this specification, and its novel features will be set forth in the appended claims.

Figure 1:
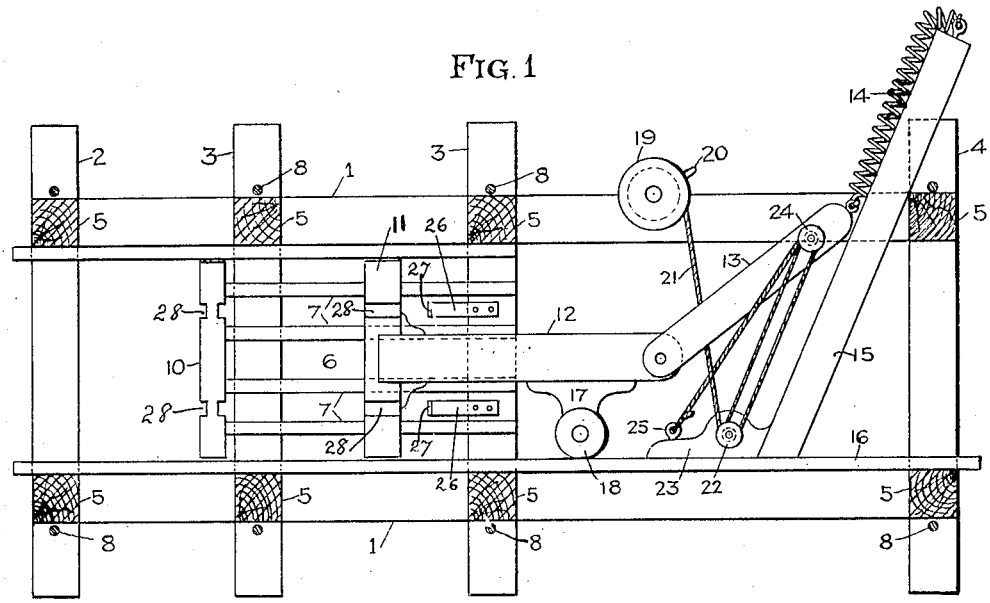
Figure 2:
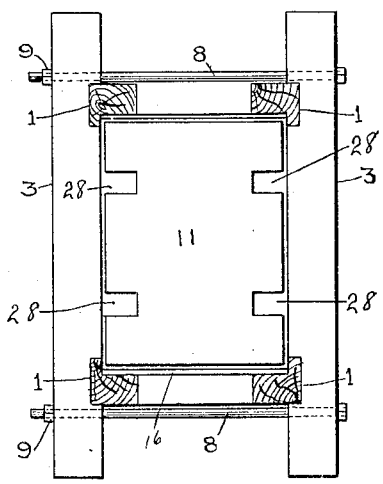
Figure 3:

In the drawing, Figure 1 is a view partly in side elevation, and partly in vertical section of a baling-press embodying the invention, Fig. 2 is a transverse section partly in front elevation of the press, and Fig. 3 is a top plan of one of the guard-springs employed for retaining the hay or other material within the baling chamber when the plunger is retracted.

The frame of the press consists of longitudinal beams 1, secured to standards 2, 3 and 4 and braced by transverse bars 5, the whole forming a rectangular structure. The space 6 between the standards 3 serves as the baling chamber, and its sides are partially closed by parallel longitudinal strips 7.

The standards of the frame are connected by headed tie-rods 8 extending through openings in the standards, and secured by nuts 9.

The front end of the baling chamber 6 is closed by a partition wall 10 serving as the stationary platen of the press against which the hay or other material is pressed by the plunger 11 which works within the baling chamber and is secured centrally to one end of a bar 12, the opposite end of which is pivotally secured to one end of a link 13. The opposite end of this link is attached to the lower end of a heavy coil spring 14, resting upon and secured at its upper end, to an inclined support 15 rising centrally from the floor 16 of the press.

Depending from the under side of the bar 12 is a bearing 17 for a roller 18, said roller being adapted to travel along a suitable track or guide-way on the floor 16.

A windlass 19 provided with a crank-handle 20 is supported in bearings in the upper longitudinal bars 1 of the frame, and to said windlass is secured one end of a rope 21. From the windlass the rope passes under a double sheave 22 mounted upon a bracket 23 supported upon the floor 16, thence over another double sheave 24 mounted on one side of the link 13 near the upper end thereof, thence again under the sheave 22, and over the sheave 24 to an eye-bolt 25 projecting from the bracket 23 to which the end of the rope is secured. To the inner side of each of the rear standards 3 are secured a plurality of horizontally-disposed spring arms 26, having their free ends 27 bent inward at right angles. These springs serve as guards to bear against the hay and support it within the baling chamber during the backward movement of the plunger.

The platen 10 and plunger 11 are formed with edge recesses 28 to facilitate the binding of the bales.

The operation of the press will be readily understood. When the windlass is operated by its crank, the rope 21 will draw down the upper end of the link 13 thus forcing the bar 12 and plunger 11 forward to press the hay. As soon as the windlass is released the contraction of the spring 14, (which has been expanded by the downward movement of the link) will retract the plunger. This movement of the plunger is continued until a bale is formed. The bar 12 being supported by the roller 18, moves forward and back with little friction, thus materially contributing to the ease of operation of the press.

What I claim and desire to secure by Letters Patent, is:—

1. In a baling-press, the combination with a rectangular frame, provided with a baling chamber, of a stationary platen at the forward end of said chamber, a plunger movable within said chamber, and means for operating said plunger comprising a bar secured at one end to the plunger, a link pivotally secured at one end to the rear end of said bar, and at its opposite end to a coil spring, an inclined support to which said coil spring is secured, a windlass mounted on the frame, and a rope secured at one end to the windlass, a double sheave at one side of said link around which said rope passes, a second double sheave fixed upon a stationary support and an eye-bolt to which the opposite end of the rope is attached.

2. In a baling press, a reciprocatory plunger, a bar connected to the plunger and having a roller depending therefrom, means arranged below the bar and constituting a guide for the roller, said roller supporting said bar during the reciprocation of the plunger, an inclined link pivotally connected at its lower end to one end of said bar, means engaging with the link for reciprocating the plunger, and an expansible and contractible spring having one end fixed and its other end attached to the free end of said link.

3. In a baling-press, the combination with a rectangular frame, provided with a baling-chamber, a stationary platen at the front of said chamber, a plunger within said chamber, a longitudinal bar secured at one end to said plunger, a bearing depending from said bar, a roller mounted on said bearing, a link pivotally secured to the rear end of said bar, an inclined support secured to the floor of the press, a coil spring secured at one end to said support, and at its opposite end to said link, a windlass, and a rope and sheaves for reciprocating said plunger.

4. In a baling press, a reciprocatory plunger, a bar connected to the plunger and having a roller depending therefrom, means arranged below the bar and constituting a guide for the roller, said roller supporting said bar during the reciprocation of the plunger, an inclined link pivotally connected at its lower end to one end of said bar, a windlass, a cable winding on and off the windlass and engaging with the link for reciprocating the plunger when the windlass is operated, and an expansible and contractible spring having one end fixed and its other end attached to the free end of the link.

In testimony whereof I affix my signature in the presence of two witnesses.

DAVID HENDERSHOT.

Witnesses:
 JOSEPH WHITE,
 WILLIAM H. COLE.